(12) United States Patent
Sekine

(10) Patent No.: US 8,841,377 B2
(45) Date of Patent: Sep. 23, 2014

(54) GLASS FIBER FOR REINFORCING POLYCARBONATE RESIN AND POLYCARBONATE RESIN FORMED ARTICLE

(75) Inventor: Keiji Sekine, Chiyoda-ku (JP)

(73) Assignee: Asahi Fiber Glass Company, Limited, Tokyo (JP)

( * ) Notice: Subject to any disclaimer, the term of this patent is extended or adjusted under 35 U.S.C. 154(b) by 769 days.

(21) Appl. No.: 11/596,290

(22) PCT Filed: May 13, 2005

(86) PCT No.: PCT/JP2005/008794
§ 371 (c)(1),
(2), (4) Date: Nov. 13, 2006

(87) PCT Pub. No.: WO2005/110695
PCT Pub. Date: Nov. 24, 2005

(65) Prior Publication Data
US 2007/0179237 A1 Aug. 2, 2007

(30) Foreign Application Priority Data
May 13, 2004 (JP) .................... 2004-143237

(51) Int. Cl.
| | | |
|---|---|---|
| B60C 1/00 | (2006.01) | |
| C03C 13/00 | (2006.01) | |
| B29K 105/06 | (2006.01) | |
| B29C 43/00 | (2006.01) | |
| B29C 47/00 | (2006.01) | |
| B29K 69/00 | (2006.01) | |
| B29C 45/00 | (2006.01) | |

(52) U.S. Cl.
CPC ............. *C03C 13/00* (2013.01); *B29K 2105/06* (2013.01); *B29C 43/003* (2013.01); *B29C 47/0004* (2013.01); *B29K 2069/00* (2013.01); *B29C 45/0001* (2013.01); *B29C 47/0009* (2013.01)
USPC .......................................... 524/494; 524/492

(58) Field of Classification Search
USPC .......... 524/492, 494; 428/374, 257, 387, 375, 428/392; 501/32, 35, 53, 69, 72, 95, 95.1, 501/36, 38; 106/52, 50, 99; 264/58, 60; 442/327, 331, 348
See application file for complete search history.

(56) References Cited

U.S. PATENT DOCUMENTS

| | | | |
|---|---|---|---|
| 3,847,626 A | | 11/1974 | Erickson et al. |
| 3,876,481 A | * | 4/1975 | Erickson et al. ............... 501/38 |
| 4,026,715 A | | 5/1977 | Erickson et al. |
| 2003/0158371 A1 | * | 8/2003 | Akamine et al. ............. 528/196 |
| 2005/0245383 A1 | | 11/2005 | Iwahashi et al. |

FOREIGN PATENT DOCUMENTS

| | | | | |
|---|---|---|---|---|
| EP | 1023 1143 | | 9/1998 | |
| FR | 2666082 | | 2/1992 | |
| JP | 49 47408 | | 5/1974 | |
| JP | 53 102325 | | 9/1978 | |
| JP | 58 60641 | | 4/1983 | |
| JP | 5 155638 | | 6/1993 | |
| JP | 5 255583 | | 10/1993 | |
| JP | 5 294671 | | 11/1993 | |
| JP | 7 118514 | | 5/1995 | |
| JP | 9 165506 | | 6/1997 | |
| JP | 2001122637 A | * | 5/2001 | ............. C03C 3/091 |
| JP | 2001-172048 | | 6/2001 | |
| JP | 2004-315351 | | 11/2004 | |
| JP | 2006-22235 | | 1/2006 | |
| WO | 03 050049 | | 6/2003 | |

OTHER PUBLICATIONS

Machine Translation of JP07118514 May 9, 1995.*
Machine Translation of JP2001122637.*
Machine Translation of JP05155638 Jun. 22, 1993.*
AP 42, Fifth Edition. (Sep. 1985) Compilation of Air Pollutant Emission Factors, vol. 1: Stationary Point and Area Sources. Chapter 11.13, Available at: http://www.epa.gov/ttn/chief/ap42/ch11/index.html.*
Machine Translation of JP09-165506 (Jun. 24, 1997).*
Extended Search Report issued Sep. 28, 2010 in Corresponding European Application No. / Patent No. 09012823.2-1218 / 2138291 filed May 13, 2005.

* cited by examiner

*Primary Examiner* — Ling Choi
*Assistant Examiner* — Chun-Cheng Wang
(74) *Attorney, Agent, or Firm* — Oblon, Spivak, McClelland, Maier & Neustadt, L.L.P.

(57) ABSTRACT

To provide a glass fiber which can improve the refractive index of the glass fiber to the same level as a polycarbonate and maintain the transmittance of a molded product after the fiber is reinforced, and a glass fiber-reinforced polycarbonate resin molded product using the glass fiber.

A glass fiber to be used as a glass fiber for reinforcing a polycarbonate resin comprising, as inorganic components in whole glass fiber, from 50 to 60 mass % of $SiO_2$, from 10 to 15 mass % of $Al_2O_3$, from 15 to 25 mass % of CaO, from 2 to 10 mass % of $TiO_2$, from 2 to 8 mass % of $B_2O_3$, from 0 to 5 mass % of MgO, from 0 to 5 mass % of ZnO, from 0 to 5 mass % of BaO, from 0 to 5 mass % of $ZrO_2$, from 0 to 2 mass % of $Li_2O$, from 0 to 2 mass % of $Na_2O$ and from 0 to 2 mass % of $K_2O$, wherein the total content of the above $Li_2O$, $Na_2O$ and $K_2O$ is from 0 to 2 mass % based on the above whole glass fiber, and the refractive index of the above glass fiber is from 1.580 to 1.590.

6 Claims, No Drawings

GLASS FIBER FOR REINFORCING POLYCARBONATE RESIN AND POLYCARBONATE RESIN FORMED ARTICLE

TECHNICAL FIELD

The present invention relates to a molded product of a fiber-reinforced resin excellent in the transparency. More particularly, it relates to a molded product of a polycarbonate resin reinforced with a glass fiber.

BACKGROUND ART

A polycarbonate resin is widely employed for transparent materials for industrial use in the field of e.g. electricity, machines or automobiles, from the viewpoint of its excellent transparency and heat resistance. Further, the polycarbonate resin is also used for e.g. lenses or optical disks as a plastic for optical materials.

In order to further improve the strength of such a polycarbonate resin, it is effective to reinforce it with a glass fiber, and at that time, it is desired to reinforce the fiber without lowering the excellent transparency of the polycarbonate resin itself.

Namely, the refractive index (refractive index by sodium D line: hereinafter referred to as nD) of E glass as an example of usual glass fiber material is approximately 1.555. Whereas, the refractive index of the polycarbonate resin is high at a level of from 1.580 to 1.590. Therefore, if a fiber made of usual E glass is dispersed in a polycarbonate resin, there will be a problem such that the transparency will be lowered by the difference in the refractive index between them.

Accordingly, it has been studied to change the composition of the glass fiber to improve the refractive index to bring it to the same level as the refractive index of a polycarbonate resin thereby to maintain the transparency of a molded product of a glass fiber-reinforced polycarbonate resin.

For example, Patent Document 1 discloses a glass fiber composition to be used for reinforcing a polycarbonate resin, comprising from 50 to 65% of $SiO_2$, from 0 to 6% of $Al_2O_3$, from 0 to 5% of MgO, from 3 to 10% of CaO, from 2 to 10% of BaO, from 0 to 7% of ZnO, from 0 to 5% of SrO, from 3 to 8% of $Na_2O$, from 3 to 8% of $K_2O$, from 0 to 5% of LiO, from 3 to 10% of $ZrO_2$ and from 5.3 to 10% of $TiO_2$, as represented by weight percentage.

Further, Patent Document 2 discloses a glass composition to be used for reinforcing a polycarbonate resin, comprising from 54.0 to 62.0% of $SiO_2$, from 8.0 to 12.0% of $Al_2O_3$, from 0 to 5.0% of MgO, from 18.0 to 22.0% of CaO, from 0 to 5.0% of BaO, from 0 to 5.0% of ZnO, from 0 to 1.0% of $Na_2O+K_2O+Li_2O$, from 0.6 to 5.0% of $ZrO_2$ and from 0.5 to 1.9% of $TiO_2$, as represented by weight percentage, and having a refractive index of from 1.5700 to 1.6000.

Further, Patent Document 3 discloses a glass fiber for reinforcing a polycarbonate resin, having optical constants such as a refractive index of from 1.570 to 1.600 and an Abbe number of at most 50.

Further, it has been studied to use a commercially available glass fiber to improve a polycarbonate resin. For example, Patent Document 4 discloses a resin composition comprising an aromatic polycarbonate resin employing, as a terminator, a reaction product of a hydroxyaralkyl alcohol and a lactone, and a glass filler having a difference of at most 0.01 in the refractive index from the aromatic polycarbonate resin.

Further, Patent Document 5 discloses a resin composition comprising an aromatic polycarbonate resin, a glass fiber having a difference of at most 0.015 in the refractive index from the aromatic polycarbonate resin, and polycaprolactone.

Patent Document 1: JP-A-58-60641
Patent Document 2: JP-A-5-155638
Patent Document 3: JP-A-5-294671
Patent Document 4: JP-A-7-118514
Patent Document 5: JP-A-9-165506

DISCLOSURE OF THE INVENTION

Problems that the Present Invention is to Solve

Among the above prior art, the glass composition of Patent Document 1 contains at least 3% of each of sodium oxide ($Na_2O$) and potassium oxide ($K_2O$), as alkali components. In such a case, the water resistance of the glass is poor due to such a large content of the alkali components, whereby the alkali components are likely to elute from the glass. Further, there is a problem such that the alkali components on the surface of the glass fiber and the polycarbonate resin are reacted at the time of molding, and thus the molecular weight of the polycarbonate resin decreases, whereby the properties as a molded product tend to deteriorate. Further, such a glass composition contains at least 2% of BaO and at least 3% of $ZrO_2$ each having a high specific gravity, whereby there is also a problem such that the weight of a resin molded product tends to increase.

Further, the glass composition of Patent Document 2, has a $TiO_2$ content as low as from 0.5 to 1.9%, and therefore, in order to reduce the difference in the refractive index between the glass composition and the polycarbonate resin, and to bring the refractive index of the glass composition to be at least 1.580, it is required to increase the content of $ZrO_2$, ZnO or BaO having a high specific gravity as a component to increase the refractive index, to a level of at least 5%. As a result, the specific gravity of the glass tends to be high, and thus the specific gravity of the resin molded product tends to increase.

Further, the glass fiber for reinforcing a polycarbonate resin of Patent Document 3, as disclosed in the composition in Examples, also contains sodium oxide ($Na_2O$) and potassium oxide ($K_2O$), as alkali components, in a large amount of at least 16.5 wt %, whereby there is a problem such that the properties of the molded product deteriorate due to decrease of the molecular weight of the polycarbonate resin, like in the case of Patent Document 1.

Further, the aromatic polycarbonate resin composition of Patent Document 4 has a problem such that the raw material of the aromatic polycarbonate resin is expensive, and therefore a molded product thereby obtainable will be expensive.

Further, the aromatic polycarbonate resin composition of Patent Document 5 contains polycaprolactone, whereby there is a problem such that the heat resistance or mechanical properties of the molded product tend to deteriorate.

Accordingly, it is an object of the present invention to provide a practical glass fiber which is capable of bringing the refractive index of the glass fiber to the same level as a polycarbonate resin and maintaining the transparency of a molded product of the polycarbonate resin reinforced with the glass fiber at the same time, and which is also capable of suppressing the deterioration of the properties of the molded product by a decrease of the molecular weight of the resin due to alkali components on the surface of the glass fiber at the time of molding, and capable of being produced industrially, and a molded product of a glass fiber-reinforced polycarbonate resin using it.

Means to Solve the Problems

The present inventors have conducted extensive studies, and as a result, they have arrived at a glass fiber for reinforcing a polycarbonate resin which can achieve the above object. The present invention provides the following.

(1) A glass fiber for reinforcing a polycarbonate resin comprising, as inorganic components in the whole glass fiber, from 50 to 60 mass % of silicon dioxide ($SiO_2$), from 10 to 15 mass % of aluminum oxide ($Al_2O_3$), from 15 to 25 mass % of calcium oxide (CaO), from 2 to 10 mass % of titanium oxide ($TiO_2$), from 2 to 8 mass % of boron oxide ($B_2O_3$), from 0 to 5 mass % of magnesium oxide (MgO), from 0 to 5 mass % of zinc oxide (ZnO), from 0 to 5 mass % of barium oxide (BaO), from 0 to 5 mass % of zirconium oxide ($ZrO_2$), from 0 to 2 mass % of lithium oxide ($Li_2O$), from 0 to 2 mass % of sodium oxide ($Na_2O$) and from 0 to 2 mass % of potassium oxide ($K_2O$), wherein the total content of the above lithium oxide ($Li_2O$), sodium oxide ($Na_2O$) and potassium oxide ($K_2O$) is from 0 to 2 mass %, based on the above whole glass fiber, and the refractive index of the above glass fiber is from 1.580 to 1.590.

(2) The glass fiber for reinforcing a polycarbonate resin according to the above (1), wherein the total content of the above zinc oxide (ZnO), barium oxide (BaO) and zirconium oxide ($ZrO_2$) is from 0 to 5 mass %, based on the above whole glass fiber.

(3) A glass fiber for reinforcing a polycarbonate resin comprising, as inorganic components in the whole glass fiber, from 50 to 60 mass % of silicon dioxide ($SiO_2$), from 10 to 15 mass % of aluminum oxide ($Al_2O_3$), from 15 to 25 mass % of calcium oxide (CaO), from 3 to 5 mass % of titanium oxide ($TiO_2$), from 0 to 5 mass % of magnesium oxide (MgO), from 0 to 5 mass % of zinc oxide (ZnO), from 0 to 5 mass % of barium oxide (BaO), from 0 to 5 mass % of zirconium oxide ($ZrO_2$), from 0 to 2 mass % of lithium oxide ($Li_2O$), from 0 to 2 mass % of sodium oxide ($Na_2O$) and from 0 to 2 mass % of potassium oxide ($K_2O$), wherein the total content of the above lithium oxide ($Li_2O$), sodium oxide ($Na_2O$) and potassium oxide ($K_2O$) is from 0 to 2 mass %, based on the above whole glass fiber, and the refractive index of the above glass fiber is from 1.580 to 1.590.

(4) The glass fiber for reinforcing a polycarbonate resin according to the above (3), which contains substantially no boron oxide ($B_2O_3$).

(5) The glass fiber for reinforcing a polycarbonate resin according to the above (3) or (4), wherein the content of the above zirconium oxide ($ZrO_2$) is from 2 to 5 mass %, and the total content of the above zinc oxide (ZnO), barium oxide (BaO) and zirconium oxide ($ZrO_2$) is from 2 to 5 mass %, based on the above whole glass fiber.

(6) The glass fiber for reinforcing a polycarbonate resin according to the above (3) or (4), wherein the total content of the above zinc oxide (ZnO) and barium oxide (BaO) is from 1 to 5 mass %, and the total content of the above titanium oxide ($TiO_2$), zinc oxide (ZnO), barium oxide (BaO) and zirconium oxide ($ZrO_2$) is from 6 to 8 mass %, based on the above whole glass fiber.

(7) A molded product of a glass fiber-reinforced polycarbonate resin obtained by molding a resin composition comprising the glass fiber as defined in any one of the above (1) to (6) and a polycarbonate resin.

(8) The molded product of a glass fiber-reinforced polycarbonate resin according to the above (7), wherein the content of the glass fiber in the above molded product is from 5 to 60 mass %.

(9) The molded product of a glass fiber-reinforced polycarbonate resin according to the above (7) or (8), wherein the difference between the refractive index of the above polycarbonate resin and the refractive index of the above glass fiber for reinforcing a polycarbonate resin is at most 0.001.

Effect of the Invention

The molded product of a glass fiber-reinforced polycarbonate resin of the present invention can maintain the transparency of the molded product even after reinforced with the fiber, and further, the content of alkali components in the glass fiber is low, whereby it is possible to suppress the decrease of the molecular weight of the resin at the time of molding, and thus to prevent the deterioration of the properties of the molded product. Further, the difference between the refractive index of the polycarbonate resin and the refractive index of the above glass fiber can be made to be at most 0.001, whereby it is possible to obtain a molded product having a remarkably high transparency at a level close to the transparency of the polycarbonate resin itself.

The molded product of a glass fiber-reinforced polycarbonate resin of the present invention, which is excellent in the transparency, is useful as a molded product which is required to have properties of both transparency and strength, such as a cover for a display of electric instruments or electronic instruments, or a substitute for a glass plate to be used for automobiles or building materials.

BEST MODE FOR CARRYING OUT THE INVENTION

Now, the glass fiber for reinforcing a polycarbonate resin will be described in further detail. In the present invention, "%" is meant for "mass %" unless otherwise specified. Further, the components contained are represented by the respective oxides, but the respective components may not necessarily be incorporated in the form of the oxides.

One embodiment (A) of the glass fiber for reinforcing a polycarbonate resin of the present invention comprises, as inorganic components in the whole glass fiber, from 50 to 60% of silicon dioxide (hereinafter referred to as $SiO_2$), from 10 to 15% of aluminum oxide (hereinafter referred to as $Al_2O_3$), from 15 to 25% of calcium oxide (hereinafter referred to as CaO), from 2 to 10% of titanium oxide (hereinafter referred to as $TiO_2$), from 2 to 8% of boron oxide (hereinafter referred to as $B_2O_3$), from 0 to 5% of magnesium oxide (hereinafter referred to as MgO), from 0 to 5% of zinc oxide (hereinafter referred to as ZnO), from 0 to 5% of barium oxide (hereinafter referred to as BaO), from 0 to 5% of zirconium oxide (hereinafter referred to as $ZrO_2$), from 0 to 2% of lithium oxide (hereinafter referred to as $Li_2O$), from 0 to 2% of sodium oxide (hereinafter referred to as $Na_2O$) and from 0 to 2% of potassium oxide (hereinafter referred to as $K_2O$), wherein the total content of $Li_2O$, $Na_2O$ and $K_2O$ is from 0 to 2%, based on the above whole glass fiber.

Further, another embodiment (B) of the glass fiber for reinforcing a polycarbonate resin of the present invention comprises, as inorganic components in the whole glass fiber, from 50 to 60% of $SiO_2$, from 10 to 15% of $Al_2O_3$, from 15 to 25% of CaO, from 3 to 5% of $TiO_2$, from 0 to 5% of MgO, from 0 to 5% of ZnO, from 0 to 5% of BaO, from 0 to 5% of $ZrO_2$, from 0 to 2% of $Li_2O$, from 0 to 2% of $Na_2O$ and from 0 to 2% of $K_2O$, wherein the total content of $Li_2O$, $Na_2O$ and $K_2O$ is from 0 to 2%, based on the above whole glass fiber.

In the compositions of the above embodiments (A) and (B) of the glass fiber, it is necessary that the content of $SiO_2$ is from 50 to 60%. If $SiO_2$ is less than 50%, the strength of the glass fiber will be low, such being undesirable. Further, if it exceeds 60%, the melting property as glass will be low, such being undesirable. Further, it is necessary that the content of $Al_2O_3$ is from 10 to 15 mass %. If $Al_2O_3$ is less than 10%, the chemical durability such as the water resistance will be low, such being undesirable. Further, if it exceeds 15%, the melting property as glass will be low, and the glass is likely to be heterogeneous, such being undesirable.

Further, it is necessary that the content of CaO is from 15 to 25%. If CaO is less than 15%, the melting property as glass will be low, such being undesirable. And, if it exceeds 25%, crystallization is likely to occur, such being undesirable. MgO is an optional component and may be incorporated in an amount of from 0 to 5%. If MgO is incorporated, Ca of the above CaO may partially be substituted by Mg, whereby it is possible to improve the mechanical properties such as the tensile strength as a glass fiber. If the content of MgO exceeds 5%, the melting property as glass will be low, such being undesirable. The content of MgO is preferably from 0.1 to 5.0%.

Further, the content of $B_2O_3$ is from 2 to 8%, or $B_2O_3$ is not substantially incorporated. Namely, the glass composition of the present invention is applicable also to a case where from 2 to 8% of $B_2O_3$ is normally incorporated, like E glass. In such a case, if the content of $B_2O_3$ exceeds 8%, the strength as a glass fiber will be low, such being undesirable. Further, the glass composition of the present invention is applicable also to a case where substantially no $B_2O_3$ is contained, like an ECR glass composition excellent in the acid resistance or the alkali resistance. Here, in the present invention, "substantially no $B_2O_3$ is contained" means that the content of $B_2O_3$ is at most 0.1%.

In the embodiment (A) of the glass fiber, it is necessary that the content of $TiO_2$ is from 2 to 10%. Since the content of $B_2O_3$ as a component to lower the refractive index is from 2 to 8%, by adjusting the content of $TiO_2$ to the above range, it is possible to improve the refractive index of the glass sufficiently and bring it close to the refractive index of the polycarbonate resin. If the content of $TiO_2$ is less than 2%, improvement of the refractive index will be insufficient. On the other hand, if the upper limit of the content exceeds 10%, the glass is likely to undergo devitrification, the strength of the glass fiber tends to be low, or the glass fiber is likely to be colored yellow, such being undesirable. The content of $TiO_2$ is preferably at most 8%, more preferably at most 6% in order to suppress yellowing of the glass fiber.

In a case where $B_2O_3$ is contained in an amount of from 2 to 8%, ZnO, BaO and $ZrO_2$ are optional components, and they may be incorporated in an amount of from 0 to 5%, respectively. When ZnO or BaO is incorporated, it is possible to increase the refractive index and suppress the devitrification. When such respective contents exceed 5%, the liquid phase temperature increases, and the devitrification is likely to occur, such being undesirable. When $ZrO_2$ is incorporated, it is possible to increase the refractive index and improve the chemical durability. If the content of $ZrO_2$ exceeds 5%, the melting property of the glass tends to be low, and the devitrification is likely to occur, such being undesirable. Further, the total content of ZnO, BaO and $ZrO_2$ is preferably from 0 to 5%, based on the above whole glass fiber, and it is more preferred that none of them may substantially be incorporated. Here, "none of them may substantially be incorporated" means that the content is less than 0.1%.

Further, in the embodiment (B) of the glass fiber, it is necessary that the content of $TiO_2$ is from 3 to 5%. Namely, the content of $TiO_2$ as a component for increasing the refractive index may be low, in a case where the content of $B_2O_3$ is low or substantially no $B_2O_3$ is contained. If $TiO_2$ is less than 3%, it is insufficient to increase the refractive index. Further, if it exceeds 5%, the refractive index will be too high, whereby the difference in the refractive index from the polycarbonate resin will be high, such being undesirable. As a component for increasing the refractive index like the above $TiO_2$, at least one component selected from the group consisting of ZnO, BaO and $ZrO_2$ is incorporated.

In a case where substantially no $B_2O_3$ is incorporated and $ZrO_2$ is from 2 to 5%, ZnO and BaO are optical components, and they may be incorporated in an amount of from 0 to 5%, respectively. When $ZrO_2$ is incorporated, it is possible to increase the refractive index and improve the chemical durability. If the content of $ZrO_2$ exceeds 5%, the melting property of the glass tends to decrease, and the devitrification is likely to occur, such being undesirable. The total content of the above ZnO, BaO and $ZrO_2$ is preferably from 2 to 5%, based on the whole glass fiber. When the total content of ZnO, BaO and $ZrO_2$ is within the above range, it is possible to obtain a glass fiber having a small difference between the refractive index of the glass fiber and the refractive index of the polycarbonate resin and being excellent in e.g. the mechanical strength. Further, the content of oxides of heavy metal components is small, whereby it is possible to suppress the weight increase of the resin molded product obtainable.

Further, in a case where substantially no $B_2O_3$ is incorporated and the total content of ZnO and BaO is from 1 to 5%, $ZrO_2$ is an optional component, and it is preferred that the total content of $TiO_2$, ZnO, BaO and $ZrO_2$ is from 6 to 8%, based on the whole glass fiber. When ZnO and BaO are incorporated, it is possible to increase the refractive index and suppress the devitrification. If their total content is less than 1%, it is difficult to increase the refractive index, and if it exceeds 5%, the liquid phase temperature tends to increase, and the devitrification is likely to occur. When the total content of $TiO_2$, ZnO, BaO and $ZrO_2$ is within the above range, it is possible to reduce the difference in the refractive index from the polycarbonate resin. Further, in order to suppress the increase of the specific gravity of the glass, it is more preferred that substantially no $ZrO_2$ is incorporated. When the total content of $TiO_2$, ZnO, BaO and $ZrO_2$ is within the above range, it is possible to obtain a glass fiber excellent in e.g. the mechanical strength, which has a small difference between the refractive index of the glass fiber and the refractive index of a polycarbonate resin. Further, the content of oxides of heavy metal components is low, whereby it is possible to suppress the weight increase of the resin molded product obtainable.

In the present invention, in addition to ZnO, BaO and $ZrO_2$, strontium oxide (hereinafter referred to as SrO) may be incorporated, as the case requires. When SrO is incorporated, the refractive index of the glass fiber can readily be adjusted to the refractive index of the polycarbonate resin. Further, in a case where SrO is incorporated in the glass composition, it is preferred that SrO is incorporated so that the total content of ZnO, BaO and SrO is from 1 to 5%, based on the whole glass fiber.

$Li_2O$, $Na_2O$ and $K_2O$ as alkali components may be incorporated in an amount of from 0 to 2% respectively. The present invention is characterized in that the total content thereof is from 0 to 2%, based on the whole glass fiber. If the total content of the alkali components exceeds 2%, the water resistance of the glass tends to decrease, and an alkali is likely to elute. Further, the molecular weight of the polycarbonate resin tends to be decreased due to the alkali components on the surface of the glass at the time of molding, and the properties of the molded product will deteriorate. It is preferred that the total content of alkali components is from 0 to 1%.

Thus, even when the total content of the alkali components is small, it is possible to improve the refractive index sufficiently and bring it close to the refractive index of the polycarbonate resin, by incorporating from 2 to 10% of $TiO_2$ in a case where $B_2O_3$ is incorporated in an amount of 2 to 8% or by incorporating from 3 to 5% of $TiO_2$ in a case where substantially no $B_2O_3$ is incorporated. Further, as the amount of the alkali components is small, it is possible to suppress the decrease of the molecular weight due to decomposition of the polycarbonate resin, and prevent the deterioration of the properties such as the strength of the molded product.

The refractive index of the glass fiber of the present invention is from 1.580 to 1.590, preferably from 1.582 to 1.590, more preferably from 1.583 to 1.586. It is thereby possible to obtain a glass fiber having a refractive index within the same range as the refractive index of the usual polycarbonate resin. Thus, with the glass fiber of the present invention having the above composition, it is possible to sufficiently improve the refractive index as compared with the refractive index (nD) of usual E glass being about 1.555, and maintain the transparency even when it is dispersed in a molded product as a reinforced fiber.

The glass fiber of the present invention may contain in addition to the above glass components, the following components within a range not to impair the drawing properties, the water resistance, etc. For example, as a component for increasing the refractive index of the glass, an oxide containing an element such as lanthanum, (La), yttrium (Y), gadolinium (Gd), bismuth (Bi), antimony (Sb), tantalum (Ta), niobium (Nb) or tungsten (W) may be incorporated. Further, as a component for suppressing coloration of the glass, an oxide containing an element such as cobalt (Co), antimony (Sb), copper (Cu) or neodymium (Nd) may be incorporated.

Further, in the glass raw material required to obtain the glass fiber of the present invention, for the purpose of suppressing coloration of the glass, the content of $Fe_2O_3$ as an impurity in the raw material, should preferably be less than 0.01%, as oxide based on the whole glass.

By balancing the composition comprising the above glass components, as a whole, it is possible for the glass fiber of the present invention to have the same drawing property, mechanical strength and chemical durability as a conventional fiber for reinforcement such as E glass fiber or ECR glass fiber.

It is possible to obtain the glass fiber of the present invention by a conventional drawing method of a glass continuous fiber. For example, it is possible to fibrillate the glass by various methods such as a Direct Melt (DM) method wherein glass raw material is subjected to devitrification continuously in a melting furnace and then introduced to a forehearth, followed by drawing by a bushing mounted at the bottom of the forehearth, and a re-melting method wherein molten glass is formed into a marble, cullet or rod shape, followed by re-melting and drawing.

The diameter of the glass fiber is not particularly limited, but is preferably from 3 to 25 μm. If it is finer than 3 μm, the contact area of the glass fiber and the resin is increased to cause irregular reflection, whereby the transparency of the molded product will be low. If it is thicker than 25 μm, the strength of the glass fiber tends to be weak, and as a result, the strength of the molded product will deteriorate.

The form of the glass fiber may suitably be selected depending on the molding method or the characteristics required for the molded product. For example, a chopped strand, roving, mat, cloth or milled fiber may be mentioned.

It is preferred that the glass fiber is surface-treated with a treating agent containing a coupling agent, to increase the affinity and the bonding properties between the polycarbonate resin and the glass fiber, thereby to suppress the decrease in transparency of the molded product due to formation of voids. As such a coupling agent, a silane type coupling agent, a borane type coupling agent, an aluminate type coupling agent or a titanate type coupling agent may, for example, be used. Especially, from the viewpoint of good bonding properties between the polycarbonate resin and the glass, the silane type coupling agent is preferably used. As such a silane type coupling agent, an aminosilane type coupling agent, an epoxysilane type coupling agent or an acrylsilane type coupling agent may, for example, be used. Among such silane coupling agents, the aminosilane type coupling agent is most preferably used.

As components other than the coupling agent contained in the treating agent, a film former, a lubricant and an antistatic agent may, for example, be mentioned, and they may be used alone or in combination as a mixture of a plurality of them. As such a film former, a polymer such as a vinyl acetate resin, a urethane resin, an acrylic resin, a polyester resin, a polyether resin, a phenoxy resin, a polyamide resin, an epoxy resin or a polyolefin resin, or a modified product thereof may be used. As the lubricant, a surfactant of a fatty acid ester type, a fatty acid ether type, an aromatic ester type or an aromatic ether type may be used. As the antistatic agent, an inorganic salt such as lithium chloride or potassium iodide, or a quaternary ammonium salt of e.g. an ammonium chloride type or an ammonium ethosulfate type may be used.

The molded product of a glass fiber-reinforced polycarbonate resin of the present invention can be obtained by molding a resin composition comprising the above glass fiber and a polycarbonate resin. The polycarbonate resin is not particularly limited, and for example, one obtainable by reacting bisphenol A and phosgene may be used. Its viscosity average molecular weight is preferably from 12,000 to 35,000.

The refractive index (nD) of the polycarbonate resin is usually within a range of from 1.580 to 1.590. As the polycarbonate resin to be used in the present invention, a conventional polycarbonate resin may be used, and a resin to be preferably used may, for example, be "LEXAN 121R" (tradename, GE Plastics Japan Ltd.) having a refractive index of 1.585 or "Iupilon S-2000" (tradename, Mitsubishi Engineering-Plastics Corporation) having a refractive index of 1.583.

The content of the glass fiber in the resin composition and the molded product is not particularly limited, or in the molded product, such a content is preferably from 5 to 60%, more preferably from 10 to 55%, based on its entirety. If the content is less than 5%, the improvement of the properties due to reinforcement with the fiber tends to be insufficient, such being undesirable, and if it exceeds 60%, the contact area of the resin and the glass increases to lower the transparency of the molded product, and further the moldability tends to be poor, such being undesirable.

Further, to the glass fiber-reinforced polycarbonate resin composition of the present invention, it is possible to add well-known additives within a range not to impair the characteristics such as the refractive index. For example, an antioxidant can suppress decomposition of the resin at the time of production or molding of the glass fiber-reinforced polycarbonate resin composition.

As the process for production the glass fiber-reinforced polycarbonate resin composition of the present invention, a conventional method may be employed. For example, it is preferred to employ a method wherein the polycarbonate resin and the glass fiber, and optional additives are mixed by employing e.g. a mixer, and the mixture is melt-kneaded and pelletized by an extruder. Then, molding is carried out by a conventional molding method such as injection molding, extrusion, press molding or calendering, whereby a molded product can be obtained. The production conditions and the molding conditions may suitably be selected and are not particularly limited, but the heating temperature at the time of melt kneading or the temperature of the resin at the time of injection molding may suitably be selected usually from 220 to 300° C., to suppress decomposition of the resin.

It is preferred that, in the molded product, the difference between the refractive index of the polycarbonate resin and the refractive index of the above glass fiber is not more than 0.001. If the difference between the refractive index of the polycarbonate resin and the refractive index of the glass fiber exceeds 0.001, the transparency of the molded product tends to be insufficient, such being undesirable.

EXAMPLES

Now, the present invention will be described in further detail with reference to Examples.
Production of Glass Fiber
Glass fibers in Examples 1 to 4 and Comparative Examples 1 to 6 were prepared to have compositions (mass %) as shown in Table 1.

was log η=3.0 was measured. The rotating-cylinder method was carried out in such a manner that, by employing an apparatus for measuring the viscosity of the glass at high temperatures, as disclosed in the specification of U.S. Pat. No. 3,056,283, the glass was put into a platinum crucible and melted, a platinum alloy spindle (or so-called gob) was immersed in such molten glass, the spindle was rotated, and a torque exerted on the spindle was measured by a viscometer directly connected to the spindle to obtain the viscosity of the molten glass.

The temperature at a melt viscosity of the glass being log η=3.0, was obtained by measuring under the following conditions by the rotating-cylinder method using the same apparatus as the apparatus disclosed in the specification of U.S. Pat. No. 3,056,283. As the viscometer, TV-20 type manufactured by TOKIMEC INC. was used, its measurement range was controlled to H, and the rotational speed was adjusted to from 1 to 50 rpm so that the viscosity of the molten glass was within a measurable range.
Measuring Condition
76 g of glass cullets pulverized to have a size of approximately 5 mm were put into a platinum alloy crucible having a diameter of 25 mm and a height of 65 mm. It took about 15 minutes until the temperature was stabilized, then a spindle having a diameter of 9 mm and a height of 33 mm was immersed and rotated, and it took 15 minutes until the tem-

TABLE 1

| Composition (mass %) | Ex. 1 | Ex. 2 | Ex. 3 | Ex. 4 | Comp. Ex. 1 E glass | Comp. Ex. 2 ECR glass | Comp. Ex. 3 | Comp. Ex. 4 | Comp. Ex. 5 | Comp. Ex. 6 |
|---|---|---|---|---|---|---|---|---|---|---|
| $SiO_2$ | 52.6 | 57.5 | 56.7 | 56.5 | 55.1 | 58.0 | 52.0 | 55.5 | 54.5 | 53.5 |
| $Al_2O_3$ | 13.3 | 12.0 | 11.5 | 12.0 | 14.0 | 11.4 | 12.0 | 13.0 | 12.0 | 12.5 |
| CaO | 21.8 | 21.0 | 21.0 | 21.0 | 23.0 | 22.0 | 20.0 | 23.5 | 20.0 | 23.0 |
| $TiO_2$ | 5.9 | 5.0 | 4.1 | 3.0 | — | 2.2 | 11.0 | — | 7.0 | 3.0 |
| $B_2O_3$ | 5.9 | — | — | — | 6.0 | — | 3.5 | — | — | — |
| MgO | 0.5 | 2.5 | 2.4 | 2.5 | 0.4 | 2.7 | 1.0 | 2.5 | 1.5 | 1.5 |
| ZnO | — | 1.5 | — | 1.5 | — | 2.7 | — | 1.5 | 1.5 | — |
| BaO | — | — | 3.8 | — | — | — | — | — | — | — |
| $ZrO_2$ | — | — | — | 3.0 | — | — | — | 3.0 | 3.0 | 6.0 |
| $Na_2O + K_2O + Li_2O$ | — | 0.5 | 0.5 | 0.5 | 0.7 | 0.8 | 0.5 | 1.0 | 0.5 | 0.5 |
| $Fe_2O_3$ | — | — | — | — | 0.2 | 0.2 | — | — | — | — |
| $F_2$ | — | — | — | — | 0.6 | — | — | — | — | — |
| Total | 100.0 | 100.0 | 100.0 | 100.0 | 100.0 | 100.0 | 100.0 | 100.0 | 100.0 | 100.0 |

The glass fiber was drawn to have a fiber diameter of 13 μm by a conventional method, and as a binder, aminosilane+urethane was added thereto so as to be 0.5 mass %.

The properties of the above glass fiber and the test specimen are summarized in Table 2. In Table 2, the drawing properties are values of the glass fibers measured by the viscometry and the devitrification temperature method, respectively. Further, the specific gravity is a value measured by the Archimedes method. The refractive index (nD) is a value obtained by measuring the test specimen by an immersion liquid method by B method disclosed in JIS-K-7142.

Here, the melt viscosity of the glass as the drawing property was measured by a rotating-cylinder method, wherein glass cullets pulverized to have a size of approximately 5 mm were put into a platinum alloy crucible and melted, and then a spindle directly connected to a viscometer was immersed and rotated to measure the viscosity of the molten glass, whereby the temperature when the melt viscosity of the glass perature was stabilized. A viscometer was connected to the opposite side of a shaft (diameter: 5 mm) linked with the spindle, and the torque of the viscometer and the temperature of the molten glass were read. The temperature set was sequentially lowered and stabilized, and then the torque of the viscometer and the temperature were likewise read. Here, in a case where the torque measurement range at a rotational speed set undergoes scale over, the measurement was carried out by lowering the rotational speed.

Further, the devitrification temperature as the drawing property was obtained in such a manner that the glass cullets pulverized to have a size of approximately 300 μm were put into a platinum alloy boat, and the boat was put into an electric furnace having a thermal gradient and left to stand for 24 hours, then cooled in an air, and then the position where a devitrified substance was precipitated was measured by a microscope to obtain a devitrification temperature (unit: ° C.).

TABLE 2

|  | Ex. 1 | Ex. 2 | Ex. 3 | Ex. 4 | Comp. Ex. 1 E glass | Comp. Ex. 2 ECR glass | Comp. Ex. 3 | Comp. Ex. 4 | Comp. Ex. 5 | Comp. Ex. 6 |
|---|---|---|---|---|---|---|---|---|---|---|
| Drawing property (° C., melt viscosity log η = 3.0) | 1187 | 1236 | 1235 | — | 1222 | 1230 | — | — | — | — |
| Drawing property (devitrification temperature) | 1158 | 1180 | 1187 | — | 1090 | 1160 | — | — | — | — |
| Specific gravity | 2.65 | 2.69 | 2.71 | — | 2.55 | 2.72 | — | — | — | — |
| Refractive index (nD) | 1.584 | 1.585 | 1.585 | 1.581 | 1.555 | 1.579 | 1.603 | 1.572 | 1.597 | 1.595 |

From the results shown in Table 2, it is evident that with the glass fibers in Examples 1 to 4, the drawing properties equivalent to conventional E glasses and ECR glasses in Comparative Examples 1 and 2 are obtained, and further, the refractive index is from 1.584 to 1.585, which is higher than 1.555 of E glass and 1.579 of ECR glass.

Further, in Comparative Examples 3 and 5 wherein the content of $TiO_2$ exceeds the upper limit in the present invention and in Comparative Example 6 wherein the content of $ZrO_2$ exceeds the upper limit of the present invention, the refractive indices exceed 1.590 which is the upper limit in the present invention. On the other hand, in Comparative Example 4 wherein no $TiO_2$ is incorporated, the refractive index is found to be less than 1.580 which is the lower limit in the present invention.

Production of Molded Product of Glass Fiber-Reinforced Polycarbonate Resin

A molded product of the glass fiber-reinforced polycarbonate resin was produced in such a manner that glass fibers in Examples 1 and 2, and Comparative Examples 1 and 2 were used, and compounding and injection molding were carried out under the following conditions.

Compounding Condition
  Polycarbonate resin: LEXAN 121R (manufactured by GE Plastics Japan, Ltd., molecular weight: 21,000, nD=1.585)
  Glass fiber: a chopped strand having a diameter of 13 μm and a length of 3 mm, number of filaments in strand: 400
  Content of glass fiber: 10 mass %
  Extruder: TEM-35B (manufactured by Toshiba Machine Co., Ltd.)
  Extrusion temperature: 280° C.
  Injection Molding Condition
  Molding Machine: IS-80G (manufactured by Toshiba Machine Co., Ltd.)
  Cylinder temperature: 300° C.
  Mold temperature: 120° C.

The optical properties and mechanical properties of the above resin molded products are summarized in Table 3. Here, the total light transmittance and the parallel light transmittance as the optical properties are values obtained in such a manner that using an NDH sensor manufactured by Nippon Denshoku Industries Co., Ltd., a sample having a thickness of 2 mm is measured in accordance with JIS-K-7361, and Haze is a value measured in such a manner that using an NDH sensor manufactured by Nippon Denshoku Industries Co., Ltd., a sample having a thickness of 2 mm is measured in accordance with the method A in JIS-K-7105.

Further, the flexural strength and the flexural modulus as mechanical properties are values obtained by measuring a sample having a thickness of 3 mm in accordance with ASTM D-790, respectively.

Further, the molecular weight of the resin is the viscosity average molecular weight as calculated from the solution viscosity measured at a temperature of 20° C., by using chloromethylene as a solvent.

TABLE 3

| Glass fiber used | Ex. 5 Ex. 1 | Ex. 6 Ex. 2 | Comp. Ex. 7 Comp. Ex. 1 | Comp. Ex. 8 Comp. Ex. 2 |
|---|---|---|---|---|
| Glass fiber content: mass % | 10 | 10 | 10 | 10 |
| Total light transmittance: % | 86.2 | 87.6 | 92.5 | 86.0 |
| Parallel light transmittance: % | 72.5 | 78.3 | 12.6 | 61.5 |
| Haze: % | 14.5 | 10.6 | 86.5 | 25.4 |
| Flexural strength: MPa | 128 | 130 | 130 | 130 |
| Flexural modulus: MPa | 3251 | 3360 | 3345 | 3352 |
| Molecular weight of resin | 20700 | 20800 | 20800 | 20700 |

As shown in Table 3, the molded products in Examples have the same level of mechanical properties as Comparative Examples, and also no decrease occurs in the molecular weights. Further, the hazes are lower as compared with Comparative Examples, and therefore, it is found that the excellent transparency can be obtained by improvement of the refractive index.

INDUSTRIAL APPLICABILITY

The glass fiber for reinforcing a polycarbonate resin and the molded product of a glass fiber-reinforced polycarbonate resin using it, obtained by the present invention, is useful for a molded product which is required to have properties of both transparency and strength, such as, a cover for a display of electric instruments or electronic instruments, or a substitute for a glass plate to be used for automobiles or building materials.

The entire disclosure of Japanese Patent Application No. 2004-143237 filed on May 13, 2004 including specification, claims and summary is incorporated herein by reference in its entirety.

The invention claimed is:

1. A glass fiber for reinforcing a polycarbonate resin comprising, as inorganic components in the whole glass fiber:
  from 50 to 60 mass % of silicon dioxide ($SiO_2$),
  from 10 to 15 mass % of aluminum oxide ($Al_2O_3$),
  from 15 to 25 mass % of calcium oxide (CaO),
  from 4.1 to 5 mass % of titanium oxide ($TiO_2$),
  from 0 to 5 mass % of magnesium oxide (MgO), from 0 to 3.9 mass % of zinc oxide (ZnO),
from 0 to 3.9 mass % of barium oxide (BaO),
0 mass % of zirconium oxide ($ZrO_2$),
from 0 to less than 1.0 mass % of lithium oxide ($Li_2O$),
from 0 to less than 1.0 mass % of sodium oxide ($Na_2O$) and
from 0 to less than 1.0 mass % of potassium oxide ($K_2O$),
wherein
a total content of the lithium oxide ($Li_2O$), sodium oxide ($Na_2O$) and potassium oxide ($K_2O$) is less than 1.0 mass %,
a total content of the zinc oxide (ZnO) and barium oxide (BaO) is from 1 to 3.9 mass %,
a total content of the titanium oxide ($TiO_2$), zinc oxide (ZnO) and barium oxide (BaO) is from 6 to 8 mass %,
and the refractive index of the above glass fiber is from 1.583 to 1.586.

2. The glass fiber for reinforcing a polycarbonate resin according to claim 1, which contains substantially no boron oxide ($B_2O_3$).

3. A transparent molded polycarbonate resin product obtained by molding a resin composition comprising:
a glass fiber; and
a polycarbonate resin;
wherein
a refractive index of the glass fiber is from 1.583 to 1.586, and
the glass fiber comprises, based on the whole glass fiber:
from 50 to 60 mass % of silicon dioxide ($SiO_2$),
from 10 to 15 mass % of aluminum oxide ($Al_2O_3$),
from 15 to 25 mass % of calcium oxide (CaO),
from 4.1 to 5 mass % of titanium oxide ($TiO_2$),
from 0 to 5 mass % of magnesium oxide (MgO),
from 0 to 3.9 mass % of zinc oxide (ZnO),
from 0 to 3.9 mass % of barium oxide (BaO),
0 mass % of zirconium oxide ($ZrO_2$),
from 0 to less than 1.0 mass % of lithium oxide ($Li_2O$),
from 0 to less than 1.0 mass % of sodium oxide ($Na_2O$) and
from 0 to less than 1.0 mass % of potassium oxide ($K_2O$),
wherein
a total content of the lithium oxide ($Li_2O$), sodium oxide ($Na_2O$) and potassium oxide ($K_2O$) is less than 1.0 mass %,
a total content of the zinc oxide (ZnO) and barium oxide (BaO) is from 1 to 3.9 mass %, and
a total content of the titanium oxide ($TiO_2$), zinc oxide (ZnO) and barium oxide (BaO) is from 6 to 8 mass %.

4. The transparent molded polycarbonate resin product according to claim 3, wherein a content of the glass fiber is from 5 to 60 mass %.

5. The transparent molded polycarbonate resin product according to claim 3, wherein the difference between the refractive index of the polycarbonate resin and the refractive index of the glass fiber is at most 0.001.

6. The transparent molded polycarbonate resin product according to claim 4, wherein the difference between the refractive index of the polycarbonate resin and the refractive index of the glass fiber is at most 0.001.

\* \* \* \* \*